(12) United States Patent  (10) Patent No.: US 8,280,837 B2
Platt et al.  (45) Date of Patent: Oct. 2, 2012

(54) CONTACT STATE ESTIMATION FOR MULTI-FINGER ROBOT HANDS USING PARTICLE FILTERS

(75) Inventors: Robert Platt, Houston, TX (US); Frank Noble Permenter, Webster, TX (US); Craig M. Corcoran, Bellaire, TX (US); Charles W. Wampler, II, Birmingham, MI (US)

(73) Assignees: GM Global Technology Operations LLC, Detroit, MI (US); The United State of America as represented by the Administrator of the National Aeronautics and Space Administration, Washington, DC (US)

( * ) Notice: Subject to any disclaimer, the term of this patent is extended or adjusted under 35 U.S.C. 154(b) by 536 days.

(21) Appl. No.: 12/474,068

(22) Filed: May 28, 2009

(65) Prior Publication Data

US 2010/0306159 A1  Dec. 2, 2010

(51) Int. Cl.
  *G06N 7/02* (2006.01)
(52) U.S. Cl. .................. 706/52; 294/110.1
(58) Field of Classification Search ............... 706/52; 294/111
  See application file for complete search history.

(56) References Cited

U.S. PATENT DOCUMENTS 4,921,293 A * 5/1990 Ruoff et al. .................. 294/111

FOREIGN PATENT DOCUMENTS

JP  2004-160594(A)  6/2004
JP  2007-285784 (A)  11/2007

OTHER PUBLICATIONS

Arulampalam, M.S.; Maskell, S.; Gordon, N.; Clapp, T.; , "A tutorial on particle filters for online nonlinear/non-Gaussian Bayesian tracking," Signal Processing, IEEE Transactions on , vol. 50, No. 2, pp. 174-188, Feb. 2002 doi: 10.1109/78.978374 URL: http://ieeexplore.ieee.org/stamp/stamp.jsp?tp=&arnumber=978374&isnumber=21093.*

Chhatpar, S.R., Branicky, M.S., "Particle filtering for localization in robotic assemblies with position uncertainty", 2005 IEEE/RSJ International Conference on Intelligent Robots and Systems.

* cited by examiner

*Primary Examiner* — Jeffrey A Gaffin
*Assistant Examiner* — Ola Olude Afolabi
(74) *Attorney, Agent, or Firm* — John A. Miller; Miller IP Group, PLC

(57) ABSTRACT

A method for identifying the location, orientation and shape of an object that a robot hand touches that includes using a particle filter. The method includes defining an appropriate motion model and a measurement model. The motion model characterizes the motion of the robot hand as it moves relative to the object. The measurement model estimates the likelihood of an observation of contact position, velocity and tactile sensor information given hand-object states. The measurement model is approximated analytically based on a geometric model or based on a corpus of training data. In either case, the measurement model distribution is encoded as a Gaussian or using radial basis functions.

20 Claims, 1 Drawing Sheet

US 8,280,837 B2

CONTACT STATE ESTIMATION FOR MULTI-FINGER ROBOT HANDS USING PARTICLE FILTERS

STATEMENT REGARDING FEDERALLY SPONSORED RESEARCH OR DEVELOPMENT

The invention described herein may be manufactured and used by or for the U.S. Government for U.S. Government (i.e., non-commercial) purposes without the payment of royalties thereon or therefore.

BACKGROUND OF THE INVENTION

1. Field of the Invention

This invention relates generally to a system and method for detecting the state of objects using sensors built into a robot hand and, more particularly, to a system and method for detecting the state of objects that employ particle filters to estimate contact states between a robot hand and an object.

2. Discussion of the Related Art

Autonomous dexterous manipulation has proven to be a challenging area for robotics research. Although many mechanically sophisticated robot hands have been developed, it is difficult to monitor exactly how the manipulator and the object it is grasping make contact. It is appealing to attempt to monitor the hand-object state visually using a camera mounted on a separate pan-tilt platform. However, occlusions that occur during the course of manipulation make localization of the object feature being contacted more difficult. Instead, tactile sensors located near the point of contact of the robot hand may be able to localize the hand-object state more accurately.

Particle filtering is an implementation of a Bayesian state estimation process that estimates system states by integrating a series of sensor measurements over time. In the robotics domain, particle filtering has primarily been applied to the problem of mobile robot localization. There are relatively few approaches to applying particle filtering to dexterous manipulation. In early research, one researcher applied particle filtering to a peg-in-hole insertion task. The peg was mounted on a robot manipulator through a six-axis load cell. A control system moved the peg toward the surface until contact was established. A "contact hyper-surface" was acquired off-line by using the manipulator to create a map of the surface. During localization, the particle filter measurement model matched peg positions to locations on the map. The approach was applied to a forward clutch assembly and localization of a few millimeters was achieved.

In related work, another researcher applied particle filtering to the problem of localizing a modeled inelastic object. An end-effector was mounted on a manipulator through a six-axis load cell. The load cell moved toward the object until contact was established. Position measurements were matched to an analytic model and localization was achieved. A method was proposed by the researcher for extending the technique to an arbitrary triangulated object.

Yet another researcher took a similar approach to localizing the position of a single contact on a known surface. As in the above work, localization was performed by measuring contact position while the manipulator touched the surface of the object. This work used an active exploration strategy to move the contact so as to achieve localization more quickly.

Particle filtering models the system as a hidden Markov process where the system state is hidden. Sensor measurements ("observations") may partially reflect the state. On each time step, the system begins in state $y_{t-1}$, executes a control signal $u_t$, and arrives at state $y_t$ while making an observation $z_t$. Because the process is a Markov, transitions to future states are conditionally independent of all previous observations $Z_t = z_1 \ldots z_t$ and control signals $U_t = u_1 \ldots u_t$:

$$P(y_t|Z_t, U_t) \tag{1}$$

This distribution is called the "belief state."

Starting with an arbitrary (possibly uniform) prior distribution, particle filtering iteratively updates the belief state on each time step by incorporating the last control signal and measurement. This is accomplished in two steps. The first step (the motion update) incorporates the most recent control signal into the belief state:

$$P(y_t | Z_{t-1}, U_t) = \sum_{y_{t-1}} P(y_t | y_{t-1}, Z_{t-1}, U_t) P(y_{t-1} | Z_{t-1}, U_t) \tag{2}$$
$$= \sum_{y_{t-1}} P(y_t | y_{t-1}, u_t) P(y_{t-1} | Z_{t-1}, U_{t-1})$$

where the Markov assumption enables the simplification $P(y_t|y_{t-1}, u_t) = P(y_{t-1}|Z_{t-1}, U_t)$ and it is possible to conclude that $P(y_{t-1}|Z_{t-1}, U_{t-1}) = P(y_{t-1}|Z_{t-1}, U_t)$ because current state is independent of future contact signals.

The second step (the measurement update) incorporates the most recent measurement as:

$$P(y_t | Z_t, \alpha \Delta U_t) = \frac{P(z_t | y_t, Z_{t-1}, U_t) P(y_t | Z_{t-1}, U_t)}{P(z_t | Z_{t-1}, U_t)} \tag{3}$$
$$= \eta P(z_t | y_t) P(y_t | Z_{t-1}, U_t)$$

Where $\eta = P(z_t|Z_{t-1}, U_t)$ is assumed to be constant. The Markov assumptions enable the equality $P(z_t|y_t) = P(Z_t|y_t, Z_{t-1}, U_t)$.

Rather than storing the belief state distribution explicitly, the particle filter maintains a finite set of k points $S_t = s_t^1 \ldots s_t^k$ such that the probability that a state belongs to this set is proportional to $P(y_t|Z_t, U_t)$. In the context of the particle filter, the motion and measurement update steps described above become the following steps.

1. for all $s_t^j \in S_t$
2. $s_t^j = \text{MotionUpdate}(s_t^j, u_t)$
3. $w_j = \eta P(z_t|s_t^j)$
4. Resample $S_{t+1}$ from $S_t$, according to the weights $W = w_1 \ldots w_k$ In step 2, each particle is stochastically displaced according to a MotionUpdate function that implicitly encodes $P(y_t|y_{t-1}, u_t)$. In step 3, each of the particles is weighted according to how likely the observation is from the new state. Finally, step 4 creates an updated set of k particles $S_{t+1}$ by sampling from $S_t$ in proportion to the weights W.

SUMMARY OF THE INVENTION

In accordance with the teachings of the present invention, a method for identifying the location, orientation and shape of an object that a robot hand touches is disclosed that includes using a particle filter. The method includes defining an appropriate motion model and a measurement model. The motion model characterizes the motion of the robot hand as it moves relative to the object. The measurement model estimates the likelihood of an observation of contact position, velocity and tactile sensor information given hand-object states. The measurement model is approximated analytically based on a geometric model or based on a corpus of training data. In either case, the measurement model distribution is encoded as a Gaussian or using radial basis functions.

Additional features of the present invention will become apparent from the following description and appended claims, taken in conjunction with the accompanying drawings.

DETAILED DESCRIPTION OF THE EMBODIMENTS

Figure 1:
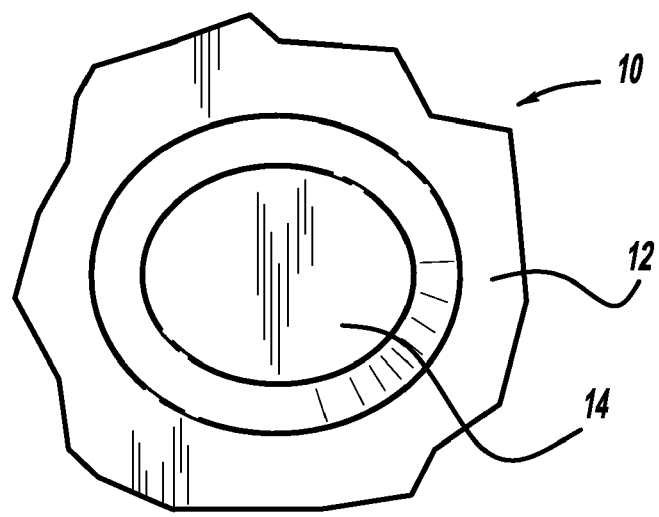
FIG. 1 shows a flexible sheet of plastic including an indent.

The following discussion of the embodiments of the invention directed to a system and method that uses particle filtering to provide state estimations to identify the location, orientation and shape of an object that a robot hand touches. However, as will be appreciated by those skilled in the art, the present invention may have applications other than robotics.

Motivated by the fact that humans rely heavily on a sense of touch during manipulation, the present invention includes a method for using force or haptic sensors mounted in a robot hand to estimate the hand-object state. The invention proposes using a combination of contact positions, contact velocities, and force sensor measurements to identify contact state between the robotic hand and an object. Three embodiments of the invention will be discussed. In the first, a measurement model is a Gaussian distribution with a mean and co-variance derived from a corpus of training data acquired off-line. In the second, the distribution is modeled by a mixture of k Gaussian radial basis functions calculated from training data. In the third, the measurement model is calculated analytically using a geometric model and assumptions regarding the distribution of measurement noise.

All embodiments of the invention use the same motion model and the same representation of system state. The motion model is implemented by a function that stochastically displaces the particles according to the probability distribution $P(y_t|y_{t-1}, u_t)$, see equation (4). Since it can be difficult to model manipulator motion as a function of $u_t$, the commanded actuator torques, the model is simplified by conditioning on a measurement of manipulator velocity instead. While this approximation does not take into account the inertial dynamics of the manipulator, it is sufficiently accurate for the purposes of the invention. The motion model is calculated by marginalizing over the space of manipulator velocities that can be produced by the command signal as:

$$P(y_t | y_{t-1}, u_t) = \sum_{\dot{q}_i} P(y_t | \dot{q}_i, y_{t-1}, u_t) P(\dot{q}_i | y_{t-1}, u_t) \quad (4)$$

However, since it is usually practical to measure manipulator velocity directly, $\dot{q}=\hat{\dot{q}}$, the summation can be eliminated by conditioning the probability of the measurement as:

$$P(y_t|y_{t-1},u_t)=P(y_t|\hat{\dot{q}}_{t-1}, y_{t-1}) \quad (5)$$

In the context of the invention, hand-object state is composed of the relative hand-object pose $\alpha$ of the object shape $\beta$ as:

$$y=\alpha,\beta \quad (6)$$

Where it is assumed that $\alpha$ describe pose in exponential coordinates.

When the hand moves relative to the object, the hand-object pose changes to an affine transformation as:

$$\alpha_{t+1}=R(\dot{q})\alpha_t+a(\dot{q}) \quad (7)$$

Where $R(\dot{q})$ and $a(\dot{q})$ describe the change in relative orientation and position caused by the motion. The motion model used by the particle filter stochastically calculates the expected hand-object state after the manipulator moves with a velocity of $\dot{q}$ for the duration of the particle filter update period.

The measurement model describes the probability of sensor measurements z as a function of system state y. This invention uses measurements of contact position, velocity, and force. These measurements are implicitly conditioned on a mechanism for finding and maintaining object contact with the hand. It is assumed that the hand makes partial object contact in the course of a given manipulation of an assembly task. At this point, compliance in the hand and arm can be used to improve and expand the number of contacts. Compliance can be achieved using mechanical compliance built into the hand or an active torque control system. In addition, a mechanism must exist for estimation where on the hand contact actually occurs. This can be achieved by clever design of the mechanical structure such that contact always occurs in the same place. Alternatively, it can be achieved by contact force sensors that directly measure loads applied to the fingers. If the hand makes contact with the object at k locations, then the vector of k contact positions, velocities, and forces can be denoted $x=(x_1, \ldots, x_k)$, $v=(v_1, \ldots, v_k)$ and $f=(f_1, \ldots, f_k)$, respectively. An estimate of contact positions $\hat{x}$ is available by determining which points on the manipulator touch the object (using force sensors or through clever design of the manipulator structure) and calculating position using prior knowledge of the manipulator forward kinematics and measurements of the vector of joint angles q. An estimate of the contact velocities $\hat{v}$ can be determined by differentiating the above. Finally, contact force sensors can be used to estimate a function of $f:\gamma=h(f)$. The combined vector of measurement is:

$$z=(\hat{x},\hat{v},\hat{\gamma}) \quad (8)$$

The three embodiments of the invention each use different measurement models. The first embodiment models the measurement vector, z, as a Gaussian with mean and co-variance a function of state as:

$$P(z|y)=N(z|m(y),S(y)) \quad (9)$$

Where $N(z|\mu,\Sigma)$ is the Gaussian probability distribution function over measurements z with a vector mean and covariance matrix $m(y)$ and $S(y)$.

The parameters $m(y)$ and $S(y)$ are determined empirically from a corpus of training data. The robot exhaustively samples state space and records the corresponding measurements. $m(y)$ and $S(y)$ are approximated by the sample mean and co-variance of the set of k-nearest neighbors. Define a distance metric in state space appropriate to its parameterization. Let $N^k(y)$ be the set of k measurements z with corresponding states closest to y. Assuming that the state space is locally Euclidian amongst the elements of $N^k(y)$, then the sample mean and covariance are:

$$m(y) = \frac{1}{k} \sum_{z_i \in N^k(y)} z_i \qquad (10)$$

And:

$$S(y) = \frac{1}{k-1} \sum_{z_i \in N^k(y)} (z - m(y))(z - m(y))^T \qquad (11)$$

The first embodiment sometimes constrains S(y) to have a block-diagonal form such that covariance between different types of measurements is assumed to be zero as:

$$S(y) = \begin{bmatrix} S_x(y) & 0 & 0 \\ 0 & S_v(y) & 0 \\ 0 & 0 & S_\gamma(y) \end{bmatrix} \qquad (12)$$

Where $S_x(y)$, $S_v(y)$ and $S_\gamma(y)$ are sample covariance matrices for the elements of $N^k(y)$ are computed separately for each measurement type.

A second embodiment of the invention approximates the measurement model using radial basis functions (RBFs) rather than a Gaussian. The RBF parameters are still determined based on a corpus of training data. However, rather than calculating a sample mean and co-variance over a set of k-nearest state-space neighbors, the distribution is modeled as a set of k RBFs:

$$P(z \mid y) = \frac{1}{\eta} \sum_{z_i \in N^k(y)} N(z \mid z_i, S_{rbf}) \qquad (13)$$

Where $\eta$ is a normalization constant and $S_{rbf}$ is a constant co-variance parameter set by the system designer.

It is worthwhile comparing the Gaussian model to the RBF model. The Gaussian approach to measurement modeling assumes that measurements are a noisy function of system state: each state is essentially associated with a single "right" answer. In contrast, the RBF approach can model a multi-model distribution. This is appropriate when causes beyond the control or observation of the system may result in a finite set of possible measurements or when the manifold of possible measurements is not Gaussian.

The application of the first and second embodiment described above are illustrated as follows. FIG. 1 is an illustration 10 of a flexible sheet of plastic 12 including a plastic indent 14. As will be discussed below, the indent 14 can be localized by a robot hand using a particle filtering process discussed herein that matches force sensor measurement against an empirical model.

Figure 2:
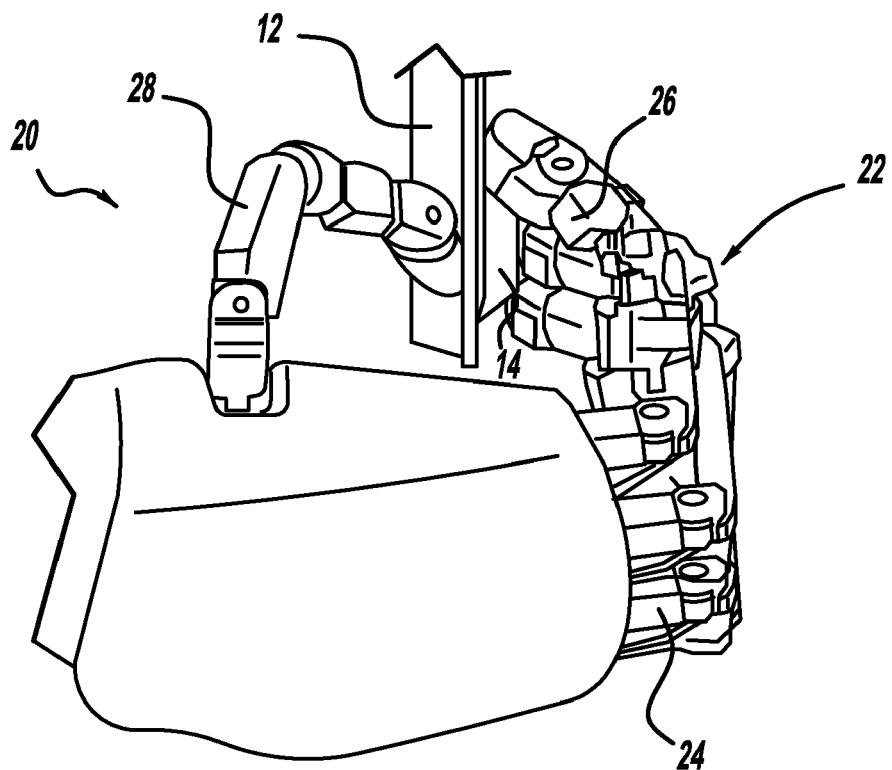
FIG. 2 is an illustration of a robot hand detecting the indent in the plastic sheet shown in FIG. 1 using a process employing particle filters to provide contact state estimations between the hand fingers and the indent.

FIG. 2 is a perspective view of a robot hand 20 that can localize the indent 14 and other shapes, object or features using a particle filter process consistent with the discussion herein. The robot hand 20 includes robot fingers 22 and a robot thumb 28 each having finger joint angle sensors 24 and finger phalange sensors 26 for sensing the objects from which the measurements are made to identify the features and provide hand-object estimation. The robot hand 20 locates the indent 14 in the sheet of plastic 12 by sliding the fingers 22 over the surface of the sheet of plastic 12. As the fingers 22 slide over the indent 14, the robot hand 20 uses the finger joint angle sensors 24 and the finger phalange sensors 26 to locate the indent 14.

A third embodiment calculates the measurement model analytically without reference to a corpus of training data. This approach may be needed when the dimension of the state space prevents adequate sampling of the measurement model distribution. It has already been pointed out that it is not always possible to assume measurements are a unique function of state. In general, it is necessary to distinguish between contact state and hand-object state. Hand-object state is estimated by the particle filter. However, contact measurements are a unique function of contact state. Multiple contact states are consistent with a given hand-object state. Let x, v and f describe the true contact position, velocity and force applied to the object. Then measurements $\hat{x}$, $\hat{v}$ and $\gamma$ can be modeled as noisy functions of the true contact state: $P(\hat{x}|x)=N(\hat{x}|x, \Sigma_x)$, $P(\hat{v}|v)=N(\hat{v}|v, \Sigma_v)$ and $P(\gamma|f)=N(\gamma|h(f), \Sigma_\gamma)$, where $\Sigma_x$, $\Sigma_v$ and $\Sigma_\gamma$ are diagonal symmetric covariance matrices. The joint distribution is therefore:

$$P(\hat{x}, \hat{v}, \gamma \mid y) = \sum_{x,v,f} P(\gamma \mid x, v, f, y) P(\hat{v} \mid x, v, f, y) \qquad (14)$$

$$P(\hat{x} \mid x, v, f, y) P(x, v, f, y)$$

$$= \sum_{x,v,f} P(\gamma \mid f, y) P(\hat{v} \mid v, y) P(\hat{x} \mid x, y) P(f \mid x, v, y)$$

$$P(v \mid x, y) P(x \mid y)$$

$$= \sum_{x,v} \left( \sum_f P(\gamma \mid f, y) P(f \mid x, v, y) \right)$$

$$P(\hat{v} \mid v, y) P(v \mid x, y) P(\hat{x} \mid x, y) P(x, y)$$

Since it is difficult to evaluate the space of contact forces analytically, it is useful to constrain the system such that applied force is a function of contact position and velocity only. This can be achieved by using force control to maintain a desired force magnitude in a particular direction. In this case, a data-driven approach can be used to model $P(\gamma|x, v, y)=\Sigma_f P(\gamma|f, y) P(f|x, v, y)$ directly. Also, note that $P(v|x, y)$ in equation (14) is deterministic. Therefore, it is possible to replace $\Sigma_v P(\hat{v}|v, y) P(v|x, y)$ with $\Sigma_{v \in \Gamma(x,y)} P(\hat{v}v, y)$ where $\Gamma(x)$ is the space of unit vectors tangent to the object surface at contact position x when the object is in configuration y. The above two substitutions allow equation (14) to be simplified as:

$$P(\hat{x}, \hat{v}, \gamma \mid y) = \eta \sum_x \sum_{v \in \Gamma(x,y)} P(\gamma \mid x, v, y) P(\hat{v} \mid v, y) P(\hat{x} \mid x, y) \qquad (15)$$

Where $\eta=P(x, y)$ is a normalization constant encoding a uniform prior on hand-object state and contact positions.

The use of equation (15) requires the computationally intensive summation over the set of possible contact positions and velocities. Constraints on the range space of x and v can make this summation more tractable. Another alternative is to approximate the summation with maximum likelihood estimates. If equation (15) is a peaked distribution, then it can be approximated by:

$$P(\hat{x},\hat{v},\gamma|y) \approx \eta' P(\gamma|x_{max},v_{max},y) P(\hat{v}|v_{max},y) P(\hat{x}|x_{max},y) \qquad (16)$$

Where, $$(x_{max}, v_{max}) = \arg\max_{(x,v) \in X \times \Gamma(x,y)} P(\gamma|x,v,y) P(\hat{v}|v,y) P(\hat{x}|x,y) \qquad (17)$$

Since even the joint maximization over x and v can be computationally cumbersome, it has been found to be feasible to replace equation (17) with:

$$x_{max} \text{argmax}_x P(\hat{x} | x) \quad (18)$$

And:

$$v_{max} \text{argmax}_v P(\gamma | v, x_{max}) P(\hat{v} | v) \quad (19)$$

Cylinder localization is one application of hand-object state estimation based on an analytical measurement model. In this example, the robot hand wraps multiple fingers around a cylinder, such as a tool handle. The robot hand moves a small amount on the cylinder. Measurements of contact positions and velocities are made at multiple contact locations. Equation (5) is used to estimate the probability of these measurements as a function of state. The particle filter proceeds with localization of the major axis direction and radius of the cylinder using these measurements. As a result, the robot determines key elements of the cylinder geometry through its haptic interaction.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating a contact state between a robot hand and an object using a particle filtering technique, said method comprising:
    providing a measurement model that describes the relationship between measurements and the contact state where the measurements include contact position, velocity and force and the contact state includes hand-object position, hand-object orientation or an object shape; and
    using the measurement model to estimate the contact state.

2. The method according to claim 1 wherein the measurement model is defined using a geometric model to estimate the probability of a contact position and velocity given a hand-object contact state.

3. The method according to claim 2 wherein the measurement model is calculated by summing over all possible contact positions, velocities and forces.

4. The method according to claim 3 wherein the summation is approximated by a maximum likelihood.

5. The method according to claim 1 wherein the measurement model is formulated based on a corpus of training data.

6. The method according to claim 5 wherein the training data is modeled by a Gaussian probability distribution with mean and co-variance parameters defined as a function of the corpus of training data.

7. The method according to claim 6 wherein the mean and co-variance parameters are defined using k-nearest neighbors in the hand-object state space.

8. The method according to claim 7 wherein the co-variance between different modalities is set to zero.

9. The method according to claim 5 wherein the training data is modeled using radial basis functions.

10. The method according to claim 9 wherein the radial basis functions are defined using K-nearest neighbors in the contact state space.

11. The method according to claim 1 wherein the object is a plastic sheet including an indent.

12. The method according to claim 11 wherein the robot estimates the position of the indent by sliding its fingers over the surface of the plastic sheet.

13. The method according to claim 1 wherein the object is a cylinder and the method determines the position, orientation and radius of the cylinder.

14. The method according to claim 13 wherein contact force information is measured using phalange load cells mounted on links of the robot fingers.

15. The method according to claim 14 wherein contact positions are determined by identifying which phalange load cell registers a non-zero force.

16. A method for estimating a contact state between a robot hand that includes robot fingers and a robot thumb and an object using a particle filtering technique, said method comprising:
    providing a measurement model that describes a relationship between measurements and the contact state where the measurements include contact position, velocity and force and the contact state includes hand-object position, hand-object orientation or an object shape, wherein the measurement model is formulated based on a corpus of training data acquired off-line; and
    using the measurement model to estimate the contact state.

17. The method according to claim 16 wherein the training data is modeled using radial basis functions.

18. A method for estimating a contact state between a robot hand and an object using a particle filtering technique, said method comprising:
    providing a measurement model that describes a relationship between measurements and the contact state where the measurements include contact position, velocity and force and the contact state includes hand-object position, hand-object orientation or an object shape; and
    using the measurement model to estimate the contact state;
    wherein the object is a plastic sheet including an indent.

19. The method according to claim 18 wherein the robot estimates the position of the indent by sliding its fingers over the surface of the plastic sheet.

20. The method according to claim 18 wherein the robot hand includes robot fingers and a robot thumb.

* * * * *